INVENTOR.
Frank W. Brown, III
BY
ATTORNEY.

United States Patent Office 3,327,113
Patented June 20, 1967

3,327,113
SOLAR RADIATION SIMULATOR INCLUDING CARBON ELECTRODES IN AN OXYGEN AND HELIUM ENVIRONMENT
Frank W. Brown III, 4313 Westmont St., Ventura, Calif. 93003
Original application June 27, 1962, Ser. No. 205,802, now Patent No. 3,277,331, dated Oct. 4, 1966. Divided and this application May 20, 1964, Ser. No. 369,039
3 Claims. (Cl. 250—50)

The invention described herein may be manufactured and used by or for the Government of the United States of America for governmental purposes without the payment of any royalties thereon or therefor.

This application is a division of applicant's co-pending application, Ser. No. 205,802, filed June 27, 1962, now U.S. Patent No. 3,277,331, for Solar Radiation Simulator, which division is being filed in response to a requirement for restriction recently noted in connection with the afore-referenced parent application.

In company with a host of environmental chambers designed to test various types and specimens of equipment to be ultimately used in outer space, it has been found necessary to include tests of such equipment under conditions simulating the effects of sunlight above the earth's atmosphere. While many sources of such simulated energy have been proposed, the high intensity carbon arcs seem most successful.

It has been found that banks of high intensity carbon arcs burning in air can be used to produce a spectral energy distribution which approximates that of the sun outside the earth's atmosphere as established by several well known researchers. Certain major discrepancies have been experienced, however, in the blue and near ultra-violet regions. These discrepancies have been ascertained to consist of strong emission bands due to CN (cyanogen). In order to approximate closely the sun's true spectra, these CN emission bands must be eliminated.

The principal object of this invention, therefore, is to provide an atmosphere for the burning arc which will be devoid of nitrogen and thus prevent the formation of the CN emission bands.

Another object of this invention is to provide auxiliary apparatus designed to control the arc's atmosphere so that its resultant spectral energy distribution will closely approximate that of the sun in outer space.

Other objects and advantages will appear in the following detailed description and accompanying drawings in which.

Figure 1:
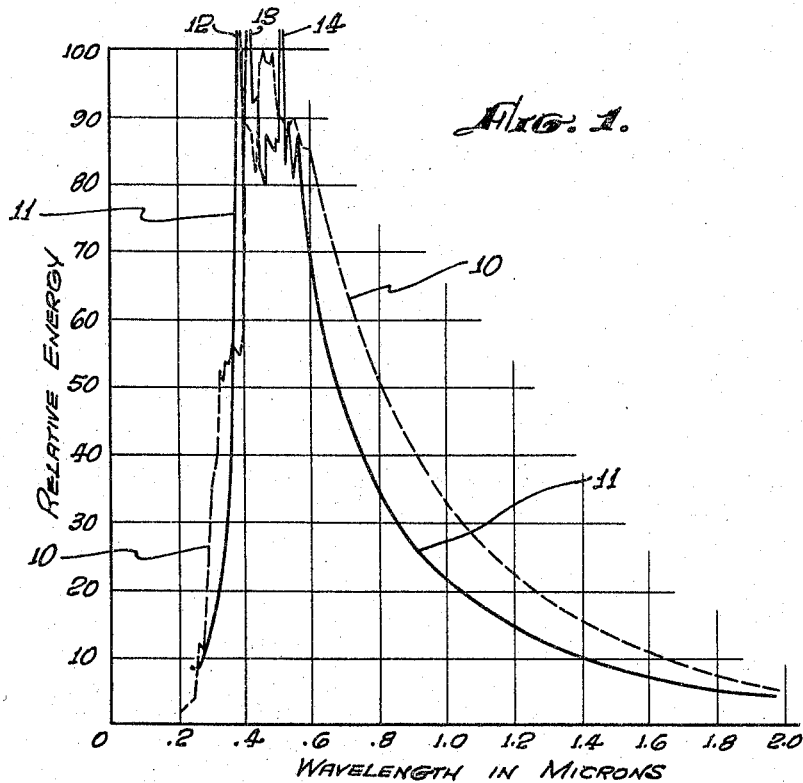
FIGURE 1 is a graph depicting comparative solar energy and arc energy distribution throughout the normal usable spectrum.
Figure 2:
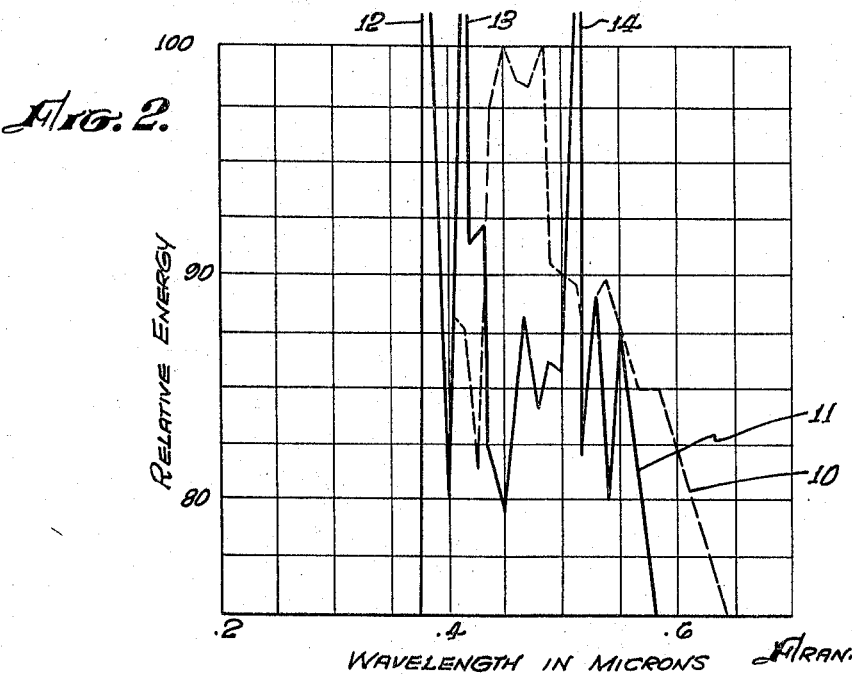
FIG. 2 is an enlargement of the above graph in the area between .35 and .65 micron.

In FIGS. 1 and 2, the dotted line 10 indicates the relative intensity of the sun's energy in outer space throughout the normally obscured spectrum. The solid line 11 indicates the energy distribution of the high intensity carbon arc. It will be noted that the CN bands produced by an high intensity arc burning in air are indicated in the black line graph principally at three points marked 12, 13, and 14. These points are left open as shown to indicate that the actual peaks occur considerably above the upper limit of the graph. Actually, these peaks rise from a relative energy value of 300 to 500 compared to the 100 shown on the graph scale. Obviously, such peaked intensities would not only be foreign to the sun's spectra but might have undesirable effects and cause unwanted reactions on and in the material or equipment being tested.

As intimated above, these undesired cyanogen bands can be entirely eliminated by controlling the arc atmosphere, particularly in excluding nitrogen therefrom. This may be readily accomplished by the apparatus schematically diagrammed in FIGS. 3 and 4.

Figure 3:
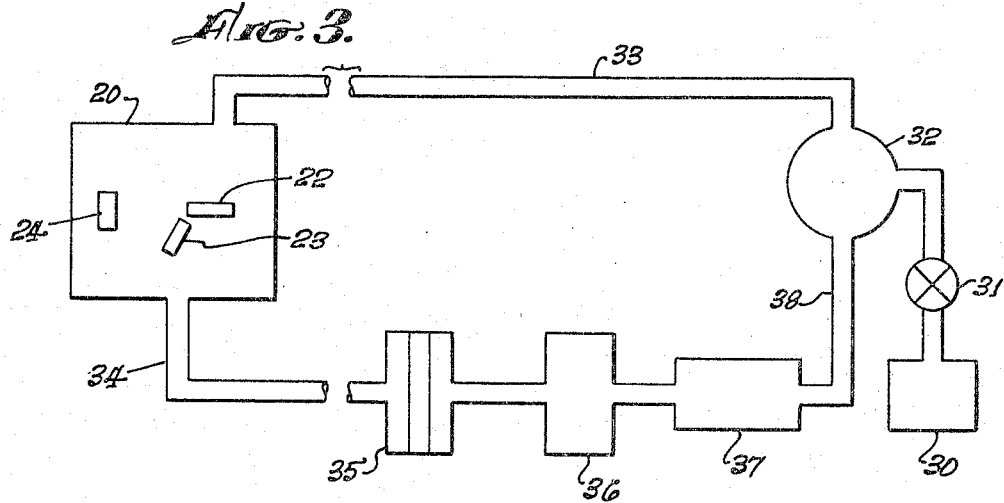
FIG. 3 is a schematic diagram of my improved arc circuit.
Figure 4:
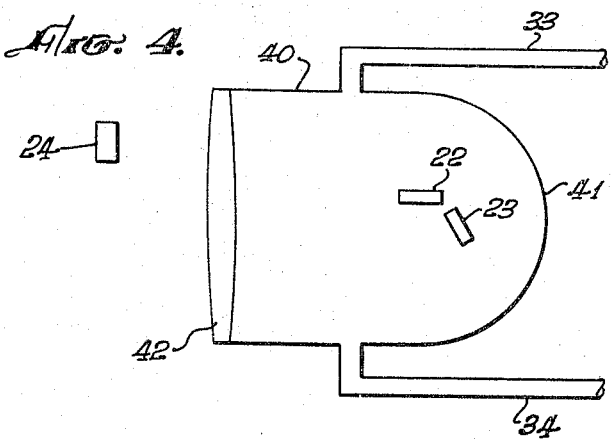
FIG. 4 is partial schematic diagram illustrating another form of arc chamber.

With reference to FIGS. 3 and 4, the arc chamber 20 contains the carbons 22, 23, and the material or equipment sample 24. Since the sample 24 is enclosed with the arc, no special mirrors, lenses, or reflectors are usually required. Such may be supplied if desired. The electrical circuits supplying energy to the arc, being well known, are not indicated or shown. The rest of the circuitry shown indicates piping or conduits conveying a selected gas or vapor from a source of supply or reservoir 30 to the arc chamber 20 and the exhaustion of the products of arc combustion therefrom.

The selected gas or vapor is pumped from reservoir 30 by pump 32. When the system is full of pure gas, valve 31 may be closed and thereafter opened only when additional make-up gas is needed. The gas is then pumped into the arc chamber 20 through conduit or pipe 33. The gas and combustion products are then exhausted through conduit or pipe 34 and pass successively through a dust filter 35, a $CO_2$ absorber 36, a heat exchange 37, and are returned to the inlet side of the pump 32 through conduit or pipe 38. Pressure and temperature measuring instruments (not shown) could be added to the system where needed.

Various gases and mixtures of gases having absorption bands outside of the wavelength range of 0.2 to 2.0 microns would be suitable including hydrogen, helium and a mixture of 20% oxygen and 80% helium. Other inert gases, such as argon, would be unsuitable because of the formation of metastable atoms which would interfere with the high current arc mechanism. While hydrogen is usable, its explosive and highly combustible nature would rule against its employment. Because of its good transparency in the UV and IR, helium is the desired gas and will result in a spectrum very closely approaching that of the outer space sun from 0.1 to 10 microns.

If, in the operation of the system, it is found that the presence of carbon particles or dust resulting from the arc combustion is objectionable, a small portion of oxygen, up to 20% of the He-O mixture, may be used to convert the carbon to $CO_2$. Carbon dust or particles would be removed by the filter 35 which may be of an ordinary hot air furnace type and, when oxygen is used, the $CO_2$ would be removed by the $CO_2$ absorber 36 which may be of a soda lime or lithium hydroxide type. Under lengthy periods of operation, heat exchange 37 may be utilized to cool the circulating gas. Air or water cooled heat exchangers could be used if desired. Under normal circumstances, the circulating gas could be used at a pressure of one atmosphere. This pressure could be varied, however, to produce maximum intensity from the arc carbons available for use and the characteristics of the electrical energy supplied thereto.

Under certain circumstances, it may be desirable to expose a sample to the simulated solar radiation externally of the arc chamber. In this event, as shown in FIG. 4, the arc chamber 40 could be provided with hemispherical or, preferably, paraboloidal reflector 41 and a lithium fluoride, aluminum oxide or quartz lens 42, depending upon the transmission characteristics desired. The gas circulating system employed here is substantially similar to that employed in the apparatus shown in FIG. 3.

Having thus described my invention, I claim:

1. A solar energy simulator for subjecting samples of outer space equipment to a spectral energy distribution similar to that of the sun beyond the earth's atmosphere comprising:

a hermetically sealed arc chamber capable of containing said sample;

a pair of carbon electrodes disposed within said chamber for producing a high intensity carbon arc;

a gas reservoir;

a gas mixture comprising oxygen and helium within said reservoir, the oxygen being for the purpose of combining with carbon particles from said carbon electrodes so as to form $CO_2$ gas, the helium being for the purpose of providing an atmosphere where undesirable emission bands are not produced; and a pumping and conduit means connected to said gas reservoir for moving the mixture of gas through the arc chamber.

2. A solar energy simulator for subjecting samples of outer space equipment to a spectral energy distribution similar to that of the sun beyond the earth's atmosphere comprising:

a hermetically sealed arc chamber capable of containing said sample;

a pair of carbon electrodes disposed within said chamber for producing a high intensity carbon arc;

a gas reservoir;

a gas mixture comprising oxygen and helium within said reservoir, the oxygen being for the purpose of combining with carbon particles from said carbon electrodes so as to form $CO_2$ gas, the helium being for the purpose of providing an atmosphere where undesirable emission bands are not produced;

a closed pumping and conduit means connected to said gas reservoir for recirculating said mixture of gas between the arc chamber and the gas reservoir;

a filtering means in said condiut means for removing said $CO_2$ from the recirculating mixture of gas; and a heat exchange means for removing undesired heat from said recirculating mixture of gas.

3. A solar energy simulator as claimed in claim 2 wherein the gas mixture of oxygen and helium is comprised of 20% oxygen and 80% helium.

References Cited

UNITED STATES PATENTS

| 2,038,825 | 4/1936 | Canady | 313—224 |
| 3,172,000 | 3/1965 | Rosener et al. | 313—12 |
| 3,200,253 | 8/1965 | Geier | 250—85 |

FOREIGN PATENTS 447,267  12/1937  Great Britain.

RALPH G. NILSON, *Primary Examiner.*

W. F. LINDQUIST, *Assistant Examiner.*